United States Patent
Gradle

(10) Patent No.: US 11,434,999 B2
(45) Date of Patent: Sep. 6, 2022

(54) VALVE ASSEMBLIES, VALVE PACKING ASSEMBLIES AND RELATED SYSTEMS AND METHODS

(71) Applicant: Flowserve Management Company, Irving, TX (US)

(72) Inventor: Richard J. Gradle, Garner, NC (US)

(73) Assignee: Flowserve Management Company, Irving, TX (US)

( * ) Notice: Subject to any disclaimer, the term of this patent is extended or adjusted under 35 U.S.C. 154(b) by 126 days.

(21) Appl. No.: 16/858,360

(22) Filed: Apr. 24, 2020

(65) Prior Publication Data

US 2020/0263809 A1    Aug. 20, 2020

Related U.S. Application Data

(62) Division of application No. 16/001,735, filed on Jun. 6, 2018, now Pat. No. 10,670,166.

(51) Int. Cl.
| | |
|---|---|
| *F16J 15/26* | (2006.01) |
| *F16K 41/02* | (2006.01) |
| *F16J 15/18* | (2006.01) |
| *F16J 15/16* | (2006.01) |
| *F16J 15/20* | (2006.01) |
| *F16K 41/04* | (2006.01) |

(52) U.S. Cl.
CPC .............. *F16J 15/26* (2013.01); *F16J 15/18* (2013.01); *F16K 41/02* (2013.01); *F16K 41/04* (2013.01); *F16J 15/166* (2013.01); *F16J 15/20* (2013.01); *F16K 41/023* (2013.01); *F16K 41/026* (2013.01); *F16K 41/046* (2013.01)

(58) Field of Classification Search
CPC .... F16J 15/18; F16J 15/20; F16J 15/26; F16J 15/166; F16K 41/02; F16K 41/023; F16K 41/026; F16K 41/04; F16K 41/043; F16K 41/046

See application file for complete search history.

(56) References Cited

U.S. PATENT DOCUMENTS

| 264,580 | A | * | 9/1882 | Stevens | .................... | F16J 15/20 |
| | | | | | | 277/531 |
| 271,300 | A | * | 1/1883 | Bassett | .................... | F16J 15/20 |
| | | | | | | 277/529 |
| 404,493 | A | * | 6/1889 | Murray | .................... | F16J 15/20 |
| | | | | | | 277/531 |

(Continued)

FOREIGN PATENT DOCUMENTS

| CN | 101495786 A | 7/2009 |
| DE | 8304427 U1 | 6/1983 |

(Continued)

OTHER PUBLICATIONS

U.S. Appl. No. 16/001,735, Non-Final Office Action dated Jan. 30, 2020, 16 pp.

(Continued)

*Primary Examiner* — Nicholas L Foster
(74) *Attorney, Agent, or Firm* — Phillips Winchester

(57) ABSTRACT

Valve stem packing assemblies may include at least one end ring and at least one sealing ring. The at least one end ring may include an inner ring and an outer ring. Valves include a valve body, a valve stem, and a valve stem packing assembly.

20 Claims, 6 Drawing Sheets

(56) References Cited

U.S. PATENT DOCUMENTS

| | | | |
|---|---|---|---|
| 721,391 A * | 2/1903 | Restein | F16J 15/20 |
| | | | 277/531 |
| 756,880 A * | 4/1904 | McIntire | F16J 15/20 |
| | | | 277/529 |
| 767,880 A | 4/1904 | McIntire | |
| 927,156 A | 7/1909 | Menczer | |
| 951,175 A | 3/1910 | Brosseau | |
| 1,205,887 A | 11/1916 | Guttner | |
| 1,717,114 A | 6/1929 | McNulty | |
| 2,895,758 A | 7/1959 | Wright | |
| 3,188,048 A * | 6/1965 | Sutherland | F16K 41/02 |
| | | | 277/532 |
| 3,284,088 A * | 11/1966 | Pippert | F16J 15/20 |
| | | | 277/540 |
| 3,554,217 A | 1/1971 | Ehrens et al. | |
| 3,586,289 A | 6/1971 | Priese | |
| 3,801,112 A * | 4/1974 | Dumazet | F16K 41/02 |
| | | | 277/529 |
| 4,256,317 A | 3/1981 | Havens et al. | |
| 4,262,690 A | 4/1981 | Binegar | |
| 4,394,023 A | 7/1983 | Hinojosa | |
| 4,516,752 A | 5/1985 | Babbitt | |
| 5,242,148 A | 9/1993 | Lange | |
| 5,263,682 A | 11/1993 | Covert et al. | |
| 5,687,974 A * | 11/1997 | Wilkinson | F16J 15/20 |
| | | | 277/537 |
| 5,716,055 A * | 2/1998 | Wilkinson | F16J 15/20 |
| | | | 277/308 |
| 6,116,573 A | 9/2000 | Cornette et al. | |
| 9,194,511 B2 * | 11/2015 | Newlands | F16K 41/04 |
| 2014/0084199 A1 * | 3/2014 | Newlands | F16K 41/04 |
| | | | 251/214 |
| 2016/0363237 A1 | 12/2016 | Fan | |

FOREIGN PATENT DOCUMENTS

| | | |
|---|---|---|
| DE | 3718274 A1 | 6/1988 |
| EP | 0130841 A2 | 1/1985 |
| EP | 2071215 A1 | 6/2009 |
| WO | 2019/236494 A1 | 12/2019 |

OTHER PUBLICATIONS

U.S. Appl. No. 16/001,735, Final Office Action dated Mar. 23, 2020, 12 pp.

International Search Report for International Application No. PCT/US2019/035243, dated Sep. 5, 2019, 2 pages.

International Written Opinion for International Application No. PCT/US2019/035243, dated Sep. 5, 2019, 4 pages.

* cited by examiner

VALVE ASSEMBLIES, VALVE PACKING ASSEMBLIES AND RELATED SYSTEMS AND METHODS

CROSS-REFERENCE TO RELATED APPLICATIONS

This application is a divisional of U.S. patent application Ser. No. 16/001,735, filed Jun. 6, 2018, the disclosure of which is hereby incorporated herein in its entirety by this reference.

TECHNICAL FIELD

Embodiments of the disclosure relate generally to valve assemblies, valve packing stacks or assemblies and related systems and methods. Some embodiments of the disclosure relate to valve packing stacks in valves or valve assemblies with rising and/or rotating valve stems, valve systems, and related methods.

BACKGROUND

There are numerous types of valves for controlling fluid flow along a fluid pathway, such as, check valves, plug valves, ball valves, stop or globe valves, angle valves, butterfly valves, and gate valves. Many valves, for example, ball valves, globe valves, butterfly valves, and gate valves, include a valve stem that control motion of a valve element. For example, the valve stem may communicate motion from an exterior portion of the valve (e.g., actuator, handle, crank, wheel, etc.) to an interior portion of the valve (e.g., the valve element, such as, a ball, plate, gate, disc, plug, etc.).

In valves that include a valve stem, a seal is generally created between the valve body and the valve stem in order to prevent or minimize fluid from traveling outside of a fluid flow portion of the valve body. In some valves the seal is created with packing material. For example, U.S. Pat. No. 4,256,317, the disclosure of which is incorporated herein in its entirety by this reference, teaches a valve packing system including compacted graphite material. Such graphite material may be formed from spirally coiled graphite tape as disclosed in U.S. Pat. No. 4,394,023, the disclosure of which is incorporated herein in its entirety by this reference.

The packing material is generally contained in a packing stack. The packing stack may include packing caps (e.g., end rings, guide rings, etc.) on outer ends of the packing stack configured to retain the packing material in position. For example, packing caps are taught by U.S. Pat. Nos. 4,256,317 and 6,116,573, the disclosure of each of which is incorporated herein in its entirety by this reference. The packing caps may be used to transmit compressive forces on the packing material to maintain a seal against the valve stem.

BRIEF SUMMARY

In some embodiments, a valve packing assembly may include a first end ring, a second end ring, and at least one sealing ring. The first end ring may include a first inner ring and a first outer ring. The first inner ring and first outer ring may comprise a first metal material. The first end ring may be configured to position the first inner ring adjacent to a movable valve stem and the first outer ring away from the movable valve stem. The second end ring may include a second inner ring and a second outer ring. The second inner ring and the second outer ring may comprise a second metal material. The second inner ring may be configured to position the second inner ring adjacent to the movable valve stem and second outer ring away from the movable valve stem. The at least one sealing ring may be located between the first end ring and the second end ring.

In some embodiments, a valve may include a valve body, a stem, and a valve stem packing assembly. The stem may extend from the valve body. The valve stem packing assembly may include a plurality of annular rings configured to form a seal around the valve stem. The plurality of annular rings may include at least one metallic end ring. The at least one metallic end ring may include an inner ring and an outer ring. The plurality of annular rings may further include at least one sealing ring positioned adjacent the inner ring and the outer ring of the at least one metallic end ring.

In some embodiments, a valve assembly may include a valve body, a valve stem, and a valve stem packing. The valve stem may be connected between the valve body and a valve element. The valve element may be configured to alter fluid flow through the valve body. The valve stem packing may include at least one sealing ring and at least one end ring located in a cavity defined in the valve body around the valve stem. The at least one end ring may be located in the cavity adjacent to the at least one sealing ring. The at least one end ring may be configured to at least partially retain the at least one sealing ring within the cavity. The at least one end ring may include an inner ring positioned proximate to the valve stem and an outer ring positioned at a location axially spaced and separated from the valve stem.

In some embodiments, methods of using a valve assembly or a valve packing may include defining a seal between a first portion of the valve assembly (e.g., a valve stem including a valve element configured to alter fluid flow through a valve body) and a second portion of the valve assembly (e.g., a portion of the valve body) with a valve packing in a cavity defined in the valve body around the valve stem. The defining the seal including maintaining at least one sealing ring in the cavity with at least one end ring in the cavity adjacent to the at least one sealing ring. The at least one end ring including an inner ring positioned proximate to the valve stem and an outer ring positioned at a location axially spaced and separated from the valve stem. The inner and outer ring may move relative to one another and/or the valve stem in order to retain the at least one sealing ring.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

Figure 1:
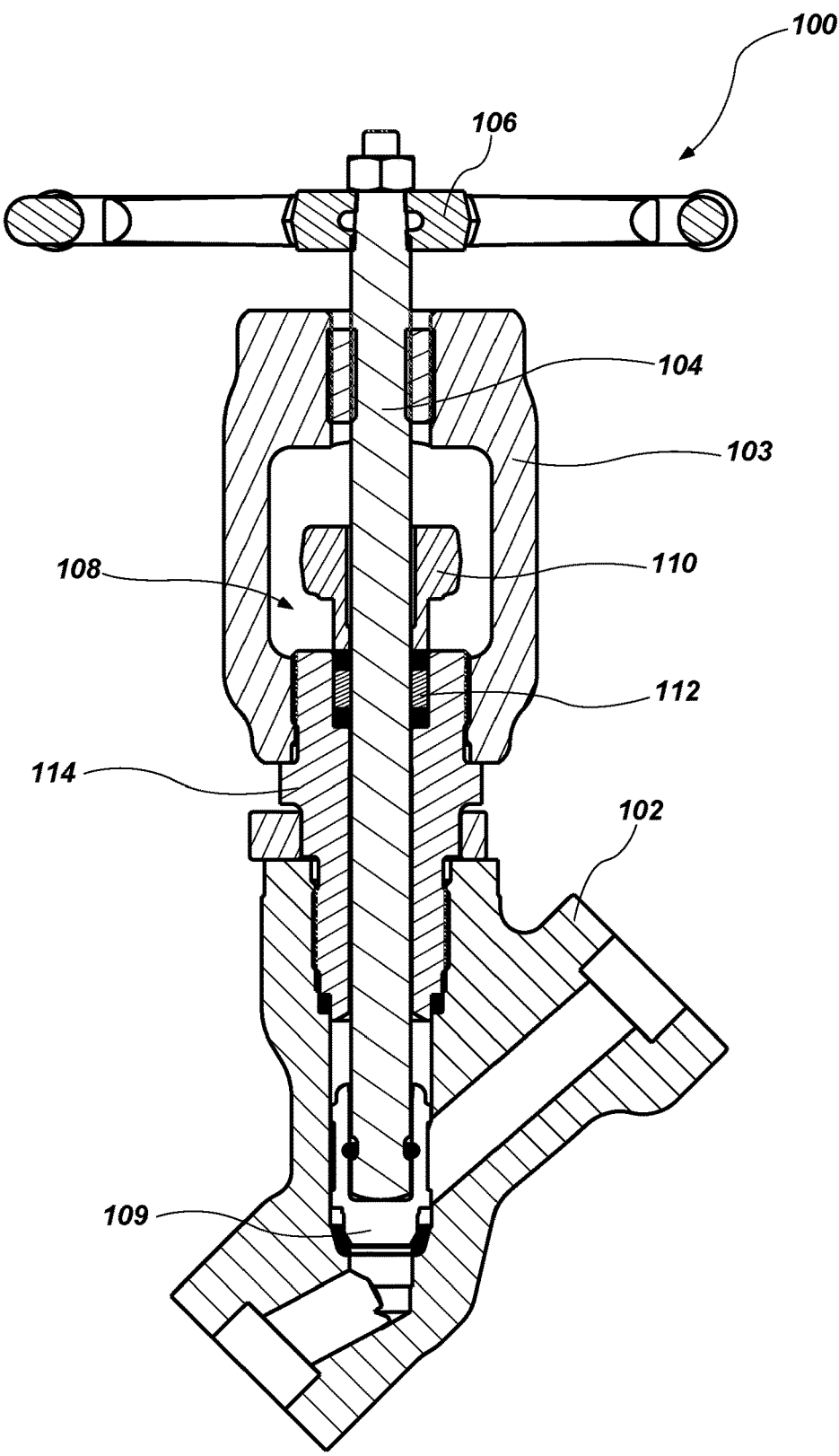
FIG. 1 is a cross-sectional view of a valve assembly according to an embodiment of the present disclosure.

The illustrations presented herein are not meant to be actual views of any particular valve assembly or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

In some embodiments, valves and/or valve assemblies are used in systems involving high temperature fluids and/or high pressure fluids. As the working temperatures and/or pressures of the systems increase, additional problems and considerations are introduced into the design of sealing systems for valves that include interfaces between internal and external components of the valves.

Typical valve sealing systems include end rings or end caps to maintain a valve packing material in position and/or to transmit compressive forces to the packing material to maintain a seal between the stem and the valve body. Typically, the end rings are formed from carbon materials, such as, carbon fiber. In high temperature systems operating temperatures can be in excess of 1,200° F. (648.9° C.), such as 1,300° F. (704.4° C.), 1,400° F. (760.0° C.), or 1,500° F. (815.6° C.). Resins present in carbon fiber typically break down at much lower temperatures, such as between about 400° F. (204.4° C.) and 500° F. (260° C.). Breaking down end rings can have disastrous results such as packing blowout, which can result in severe injuries and/or costly plant shut downs.

Some valves may attempt to remedy the temperature limitations of carbon fiber end rings by placing the sealing system large distances from the operating fluid to allow the body to dissipate heat before the temperature reaches the end rings. This may result in valves that are much larger and/or complex than necessary. Further, space constraints and/or material constraints may make moving the sealing system away from the material difficult or impossible.

FIG. 1 illustrates a cross-sectional view of an embodiment of a valve assembly 100. The valve assembly 100 may include a valve body 102, a stem 104, an actuating element 106 (e.g., handle, crank, hand wheel, electronic actuator, pneumatic actuator, hydraulic actuator, other types of at least partially automatic actuators, etc.), and a bonnet assembly 108. The bonnet assembly 108 may be configured to create a seal between the valve body 102 and the stem 104. For example, the bonnet assembly 108 may at least partially isolate fluid flowing within the valve assembly 100 from traveling outside of intended fluid flow volume along the stem 104. The stem 104 may be configured to communicate motion (e.g., rotation and/or translation) from the actuating element 106 located externally (e.g., outside the valve body) to a valve element 109 (e.g., gate, disc, wedge, poppet, plug, ball, spindle, plate, etc.) located internally in the valve body 102 (e.g., inside the valve body 102). As depicted, the valve body 102 may include a valve yoke 103 coupled to the bonnet assembly 108 on one side (e.g., an actuation side) of the valve assembly 100.

In some embodiments, the valve body 102 may include one or more portions of the bonnet assembly 108 (e.g., valve bonnet 114). For example, the valve bonnet 114 may be a part of the valve body 102. It is noted that, while the embodiments presented herein generally discuss a packing stack that may define a seal between a portion of the valve body 102 (e.g., the valve bonnet 114) and the stem 104, in other embodiments, the packing stack may define a seal between other portions of a valve assembly. For example, the packing stack may define a seal between a portion of the valve body 102 and the stem 104 where the valve body 102 may lack a valve bonnet.

Figure 2:
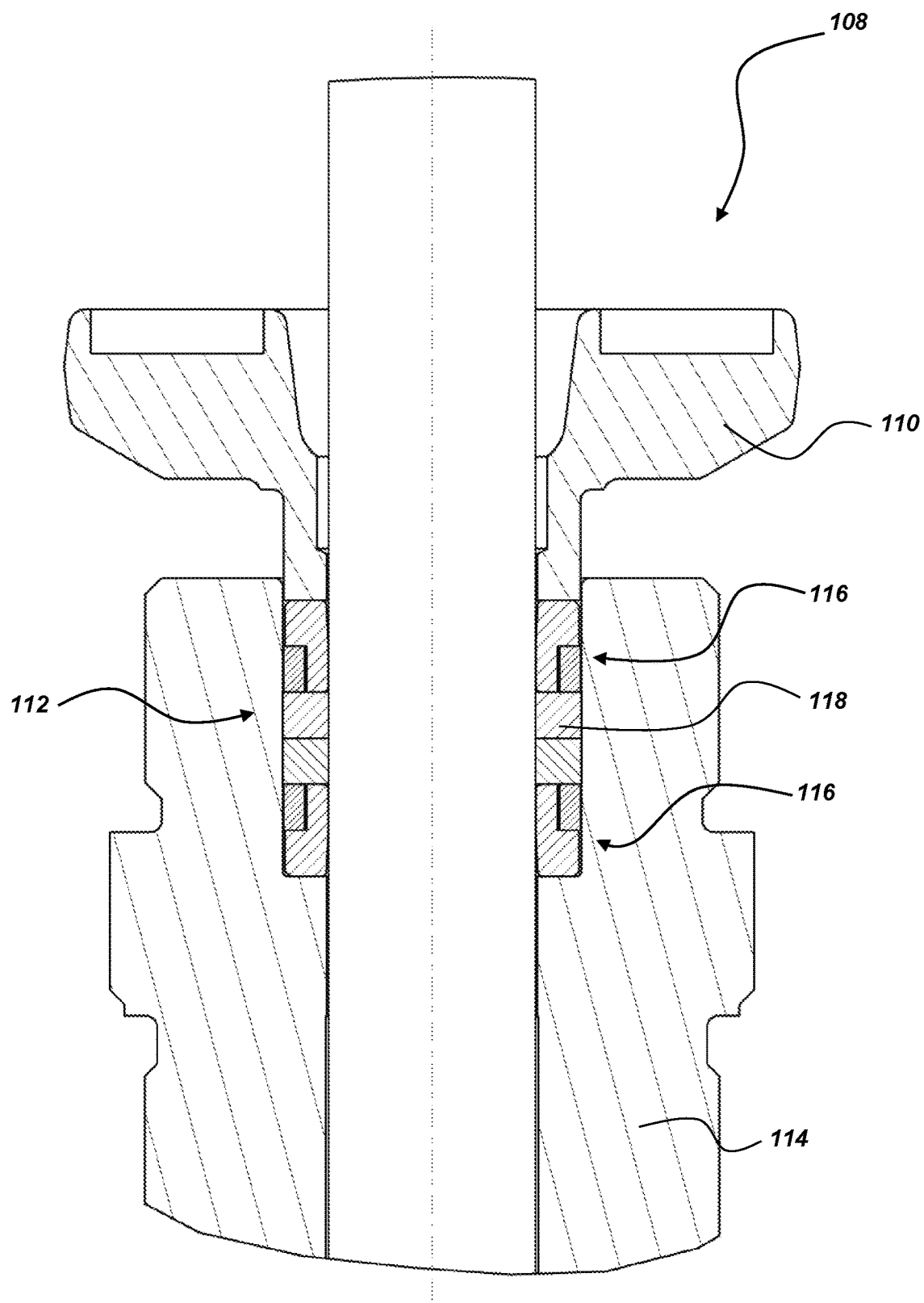
FIG. 2 is a cross-sectional view of a bonnet assembly according to an embodiment of the present disclosure.

FIG. 2 illustrates a cross-sectional view of an embodiment of a bonnet assembly 108. As depicted, the bonnet assembly 108 may include a packing gland 110, a packing stack 112 (e.g., a stem packing), and the valve bonnet 114. The valve bonnet 114 may define a cavity (e.g., channel, stuffing box, packing chamber, etc.). The packing stack 112 may be positioned within (e.g., disposed) the cavity and configured to form a seal between a portion of the valve body 102 (e.g., the valve bonnet 114) and the valve stem 104. The packing gland 110 may be positioned on an end (e.g., side) of the packing stack 112 to secure the packing stack 112 in the cavity. The packing gland 110 may apply a compressive force on the packing stack 112, such that the seal created by the packing stack 112 may increase. For example, at least a portion of the packing stack 112 may deform under the compressive force expanding in a direction transverse to the compressive force thereby closing (e.g., reducing) the size of a gap or gaps (e.g., clearance, space, void) that may exist between the packing stack 112 and the stem 104. The packing gland 110 may be positioned on an opposite end of the packing stack 112 from the working fluid, such that the packing gland 110 may provide a force in opposition to a force provided by the working fluid due to fluid pressure in the system and maintain the packing stack 112 within the cavity in the valve bonnet 114.

In some embodiments, the packing gland 110 may include a threaded engagement with the valve bonnet 114 such that the force imposed by the packing gland 110 on the packing stack 112 (e.g., the force applied to the packing stack 112 between the packing gland 110 and the valve bonnet 114) may be increased or decreased by threading or unthreading the packing gland 110 from the valve bonnet 114. In some embodiments, forces to secure the packing stack 112 in the cavity and/or to increase the sealing provided by the packing stack 112 may be applied to the packing stack 112 through a hardware connection (e.g., bolts, screws, studs, nuts, etc.) positioned between the packing gland 110 and the bonnet 114 and/or the valve body 102 (FIG. 1). In some embodiments, the packing gland 110 may include a secondary member (e.g., clamping arm, packing nut, etc.) configured to apply a force on the packing gland 110, such that the packing gland 110 may transfer the force to the packing stack 112.

Figure 3:
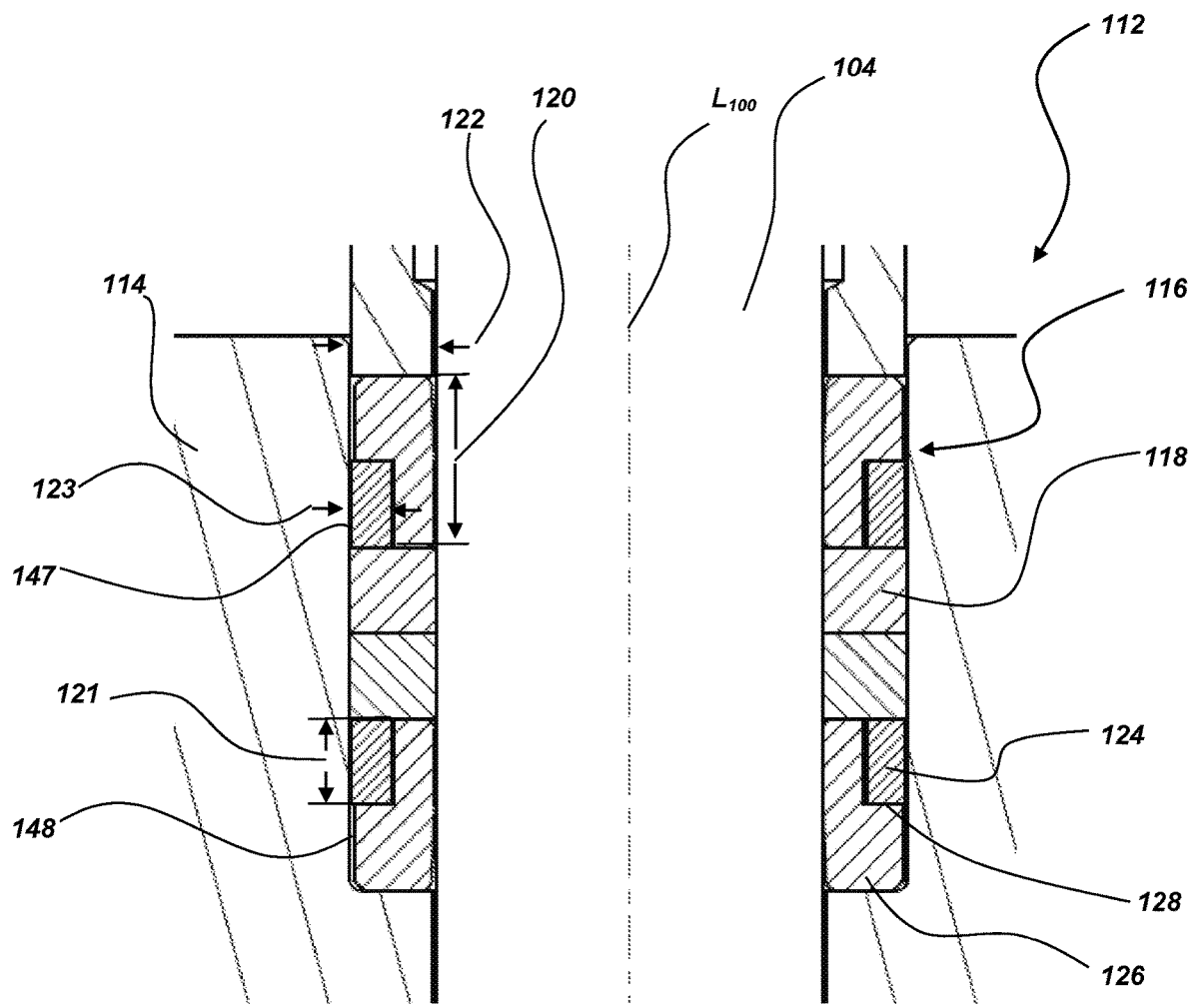
FIG. 3 is an enlarged view of a cross-sectional view of a stem packing according to an embodiment of the present disclosure.

FIG. 3 illustrates an enlarged view of a cross-sectional view of an embodiment of the packing stack 112. As depicted, the packing stack 112 may include several annular rings of packing element and/or material. In some embodiments, the packing stack 112 may include one or more end rings 116 (e.g., end cap, two opposing end rings) and one or more packing rings 118 (e.g., two packing rings 118). The end ring 116 may be located on an end of the packing stack 112. In some embodiments, the end ring 116 may be located on an end of the packing stack 112 opposite the working fluid, such that the end ring 116 may maintain the packing ring 118 between the end ring 116 and the working fluid. In some embodiments, the packing stack 112 may include two end rings 116. The end rings 116 may be located on opposite ends of the packing stack 112 such that the packing rings 118 are positioned between the end rings 116.

Some embodiments may include between one and ten packing rings 118, such as between one and five, or between two and three. The packing rings 118 may be formed from individual annular rings of material. The packing rings 118 may be formed from a string (e.g., cord, braided fibers, tape, etc.) formed into a coil corresponding to the number of packing rings 118. In some embodiments, the packing rings 118 may be formed from an injectable material injected into the cavity defined by the valve bonnet 114.

In some embodiments, the packing rings 118 may be formed from flexible materials capable of operating at elevated temperatures, such as graphite, carbon, PTFE, fiberglass, polyimides, etc. In some embodiments, the packing rings 118 may be formed from a single material in a braided configuration or mixtures of the materials in braided configurations. Some embodiments may include a lubricating material (e.g., graphite coating, PTFE coating, etc.) on and/or in the material forming the packing rings 118.

As depicted, the end rings 116 may have an annular (e.g., ringed, circular, cylindrical, etc.) shape. The end rings 116 may define an annular opening about an axis $L_{100}$. The end rings 116 may be coaxial with the valve stem 104 such that the end rings 116 and the valve stem share a common centerline (e.g., longitudinal axis $L_{100}$). The end rings 116 may define an axial dimension 120 (e.g., height, or depth) and a radial dimension 122 (e.g., width, or thickness). In some embodiments, the dimensions may be configured to locate and/or retain the end rings in a desired position and/or orientation. For example, the dimensions may be configured to prevent unnecessary contact between the end rings 116 and the stem 104, to enable the stem 104 to move (e.g., axially and/or radially without binding on the end rings 116), and/or to provide tight clearances to maintain the packing material forming the packing rings 118 within the cavity defined by the valve bonnet 114.

In some embodiments, the axial dimension of the end ring 116 may be at least one and a half times, twice (e.g., double, two times), three times, or greater the radial dimension of the end ring 116. For example, the ratio between the axial dimension 120 and the radial dimension 122 may be between about 1.5:1 and about 6:1, such as between about 2:1 and about 4:1, or between about 2:1 and about 3:1. In some embodiments, the end rings 116 may be formed from a rigid material to transmit the compressive forces from the packing gland 110 to the packing rings 118 without substantial deformation of the end rings 116.

In some embodiments, the end rings 116 may be formed from a metal or metal alloy material configured to operate in high pressure and/or high temperature environments (e.g., in continuous service in a caustic environment). For example, the end rings 116 may be formed from a metal or metal alloy material suitable for reliable operation without substantial failure at temperatures above about 1,200° F. (648.9° C.), such as above about 1,300° F. (704.4° C.), above about 1,400° F. (760° C.), above about 1,500° F. (815.6° C.), or above 1,700° F. (926.7° C.). In such embodiments, the end rings 116 may be formed from metals and/or metal alloys including materials, such as, for example, silicon, manganese, chromium, nickel, columbium (niobium), molybdenum, tantalum, cobalt, and iron. For example, the end rings 116 may comprise metals or alloys including 218 (e.g., NITRONIC® 60®, UNS S21800), 600 (e.g., INCONEL® 600, UNS N06600), 601 (e.g., INCONEL® 601, UNS N06601), 625 (e.g., INCONEL® 625, UNS N06625), 718 (e.g., INCONEL® 718, UNS N07718), 740H (e.g., INCONEL® 740H, UNS No. N07740), 800H (e.g., INCOLOY® 800H, UNS N08810), 800HT (e.g., INCOLOY® 800HT, UNS N08811), or 4140 (e.g., UNS G41400).

In some embodiments, the metal material of the end rings 116 may be the same metal material as the valve bonnet 114 and/or the valve body 102 (FIG. 1). In some embodiments, the end rings 116 may each be formed from the same material. In some embodiments, the end rings 116 may be formed from different materials. For example, the end ring 116 proximate the working fluid may be formed from a different material than the end ring 116 on the opposite end of the packing stack 112 (e.g., where the working fluid may comprise a caustic, a high temperature, a high pressure, and/or another potentially damaging fluid.

In some embodiments, the end rings 116 may include two or more rings (e.g., interlocking rings, complementary rings, etc.). The interlocking rings may include an outer ring 124 and an inner ring 126. As depicted, the inner ring 126 may define a shelf 128 (e.g., an annular notch, an annular recess) configured to retain the outer ring 124 in a volume defined between the inner ring 126, the valve bonnet 114, and the packing rings 118. In some embodiments, the outer ring 124 may be configured to fit substantially entirely within the shelf 128 when assembled. The outer ring 124 may fit in the shelf 128 such that a bottom surface of the outer ring 124 and a bottom surface of the inner ring 126 may be substantially coplanar (e.g., aligned). For example, the bottom surfaces of the inner ring 126 and the outer ring 124 may be adjacent the packing rings 118. While, as depicted, the inner ring 126 and the outer ring 124 are shown with substantially parallel surfaces (e.g., extending substantially parallel or perpendicular) to the valve stem 104) that are positioned adjacent to each other (e.g., bordering, opposing surface defining a common boundary) in the axial and/or radial directions, in other embodiments, such adjacent interacting surfaces may comprise other configurations. For example, such surfaces may be aligned at oblique angles (e.g., tapered surfaces of tapered rings, angled surfaces, etc.), have irregular complementary surfaces (e.g., with protrusions and recesses), have stepped surface features, and/or other complementary features.

In some embodiments, the inner ring 126 may be configured such that the axial dimension 120 of the inner ring 126 is approximately double an axial height 121 of outer ring 124. The outer ring 124 may be configured such that the radial dimension 122 of the end ring 116 is approximately double a radial width 123 of the outer ring 124. In some embodiments, an outer surface 147 of the outer ring 124 may be substantially aligned with an outer surface 148 of the inner ring 126. In other embodiments, the outer surface 147 of the outer ring 124 and the outer surface 148 of the inner ring 126 may not be substantially aligned such that a clearance between the outer surface 147 of the outer ring 124 and the valve bonnet 114 is different from a clearance between the outer surface 148 of the inner ring 126 and the valve bonnet 114.

Figure 4:
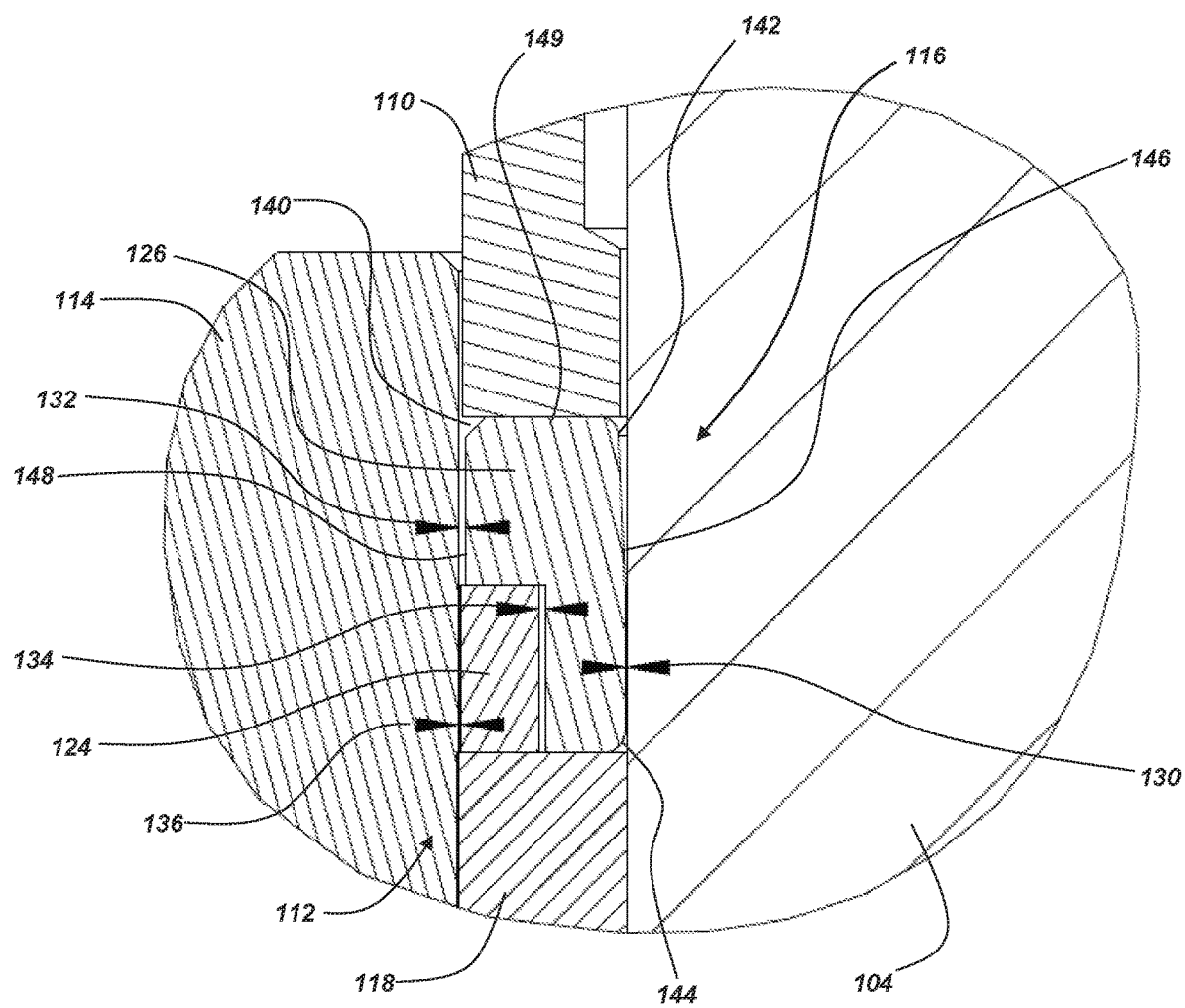
FIG. 4 is an enlarged cross-sectional view of a portion of a stem packing according to an embodiment of the present disclosure.

FIG. 4 illustrates an enlarged cross-sectional view of a portion of an embodiment of the stem packing (e.g., packing stack 112). In some embodiments, the inner ring 126 and the outer ring 124 may define one or more clearances between the inner ring 126, outer ring 124, the stem 104, and the valve bonnet 114. In some embodiments, one or more of the clearances, e.g., discussed below, may provide voids positioned along a radial direction that, for example, enable radial movement of the valve stem 104.

The inner ring 126 may define a stem clearance 130 between the inner ring 126 and the stem 104. The stem clearance 130 may allow the stem to move (e.g., radially displace) relative to the end ring 116 and/or allow for thermal expansion of the components of the valve assembly 100 (FIG. 1). In some embodiments, the stem clearance 130 may be configured to enable movement of the inner ring 126 relative to the stem 104, for example, during assembly or disassembly, responsive to radial movement of the stem 104, and/or responsive to the compressive forces exerted by the packing gland 110. For example, once assembled, the packing gland 110 may be adjusted to increase or decrease pressure on the packing stack 112 by moving the packing gland 110 a distance toward or away from the packing stack 112, which, in turn, may cause the end ring 116 to move toward or away from the packing rings 118. In some embodiments, stem clearance 130 may be sized and configured to substantially prevent the packing material from the packing rings 118 from being extruded past the end ring 116 when the packing stack 112 is under compressive pressure from the packing gland 110 or fluid pressure within the valve body 102 (FIG. 1). The stem clearance 130 may be between about 0.001 in (0.0254 mm) and about 0.008 in (0.2032 mm), such as between about 0.001 in (0.0254 mm) and about 0.005 in (0.127 mm), or between about 0.002 in (0.0508 mm) and about 0.004 in (0.1016 mm).

In some embodiments, the inner ring 126 may define an outer clearance 132 between the inner ring 126 and the valve bonnet 114. The outer clearance 132 may be configured to enable movement between the end ring 116 and the valve bonnet 114, for example, the outer clearance 132 may allow the end ring 116 to move relative to the valve bonnet 114 responsive to the compressive forces exerted by the packing gland 110 when adjustments are made to the packing gland, during assembly or disassembly, responsive to radial movement of the stem 104, and/or during operation. In some embodiments, the outer clearance 132 may be configured to enable for expansion and/or contraction of the inner ring 126, the outer ring 124, and/or the valve bonnet 114. The outer clearance 132 may be between about 0.001 in (0.0254 mm) and about 0.008 in (0.2032 mm), such as between about 0.001 in (0.0254 mm) and about 0.005 in (0.127 mm), or between about 0.002 in (0.0508 mm) and about 0.004 in (0.1016 mm).

In some embodiments, the inner ring 126 and the outer ring 124 may define a ring clearance 134 between the inner ring 126 and the outer ring 124. The ring clearance 134 may be configured to enable the inner ring 126 and the outer ring 124 to expand and/or contract. In some embodiments, the ring clearance 134 may be configured to enable for different rates of thermal expansion between the inner ring 126 and the outer ring 124. In some embodiments, the ring clearance 134 may be configured to allow movement between the inner ring 126 and the outer ring 124, for example, during assembly and/or disassembly and/or responsive to radial movement of the stem 104. The ring clearance 134 may be between about 0.001 in (0.0254 mm) and about 0.008 in (0.2032 mm), such as between about 0.001 in (0.0254 mm) and about 0.005 in (0.127 mm), or between about 0.002 in (0.0508 mm) and about 0.004 in (0.1016 mm).

In some embodiments, the outer ring 124 may define a bonnet clearance 136 between the outer ring 124 and the valve bonnet 114. In some embodiments, the bonnet clearance 136 may be configured to allow movement of the outer ring 124 relative to the bonnet 114. For example, the bonnet clearance 136 may allow the outer ring 124 to translate relative to the valve bonnet 114 responsive to pressure applied by the packing gland 110 through the inner ring 126, responsive to radial movement of the stem 104, and/or for assembly or disassembly. In some embodiments, the bonnet clearance 136 may be configured to enable for thermal expansion and contraction of the outer ring 124 and the valve bonnet 114. In some embodiments, the bonnet clearance 136 may be configured to substantially prevent the packing material of the packing rings 118 from extruding past an outer portion of the end ring 116. The bonnet clearance 136 may be between about 0.001 in (0.0254 mm) and about 0.008 in (0.2032 mm), such as between about 0.001 in (0.0254 mm) and about 0.005 in (0.127 mm), or between about 0.002 in (0.0508 mm) and about 0.004 in (0.1016 mm).

In some embodiments, the combination of clearances 130, 132, 134, and 136 may enable for each individual clearance 130, 132, 134, and 136 to be relatively smaller while maintaining flexibility for expansion (e.g., thermal expansion), contraction, and/or movement between the different components of the bonnet assembly 108 (FIG. 2) and/or the valve assembly 100 (FIG. 1) (e.g., the valve stem 104).

In some embodiments, the inner ring 126 may include one or more chamfered (e.g., rounded, beveled) edges. The chamfered edge may be configured to enhance movement between the inner ring 126 and the stem 104 (e.g., by reducing friction, by reducing the probability of inner ring 126 deforming due to movement of the stem 104) and/or substantially prevent scoring (e.g., damaging, etching, carving, etc.) the stem 104.

For example, an inner surface 146 of the inner ring 126 may be positioned proximate the stem 104 (e.g., directly adjacent). A distal inner edge 142 (e.g., further from the connection between the stem 104 and the valve element 109 (FIG. 1)) and a proximal inner edge 144 (e.g., closer to the connection between the stem 104 and the valve element 109 (FIG. 1)) may be located on opposite ends of the inner surface 146 of the inner ring 126 with the proximal inner edge 144 located adjacent to the packing rings 118. In some embodiments, the distal inner edge 142 and the proximal inner edge 144 may both be chamfered in a direction away from the stem 104 (e.g., extending radially outward). In some embodiments, the chamfer on the proximal inner edge 144 and the chamfer on the distal inner edge 142 may be different. For example, the chamfer on the proximal inner edge 144 may be smaller or larger (e.g., in diameter, span, curvature, arc length, arc curvature, etc.) than that of the chamfer on the distal inner edge 142 of the inner ring 126.

In some embodiments, an outer edge 140 may be located at an intersection between an outer surface 148 and a distal surface 149 of the inner ring 126. In some embodiments, the outer edge 140 may be chamfered in a direction away from the valve bonnet 114. In some embodiments, the outer edge 140 and the distal inner edge 142 may each be chamfered. In some embodiments, the chamfer on the outer edge 140 may have a different configuration (e.g., size, shape, curvature, angle, etc.) than the chamfer on the distal inner edge 142. In some embodiments, the outer edge 140 and the proximal inner edge 144 may each be chamfered. In some embodiments, the outer edge 140, the distal inner edge 142, and the proximal inner edge 144 may all be chamfered. In some embodiments, at least one of the chamfers on the outer edge 140, the distal inner edge 142, and the proximal inner edge 144 may have different configurations.

Figure 5:
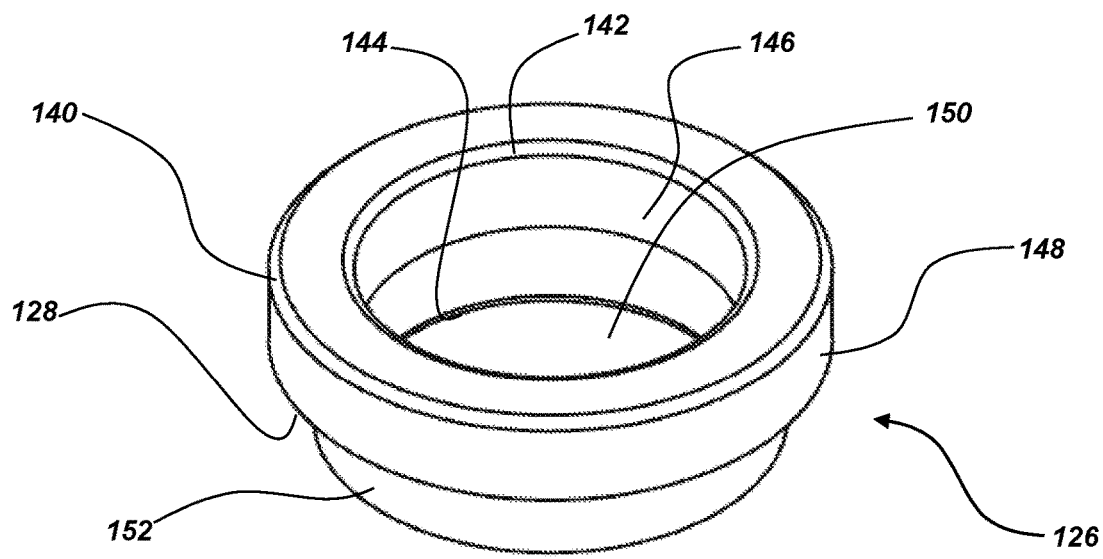
FIG. 5 is an isometric view of an end ring according to an embodiment of the present disclosure.
Figure 6:
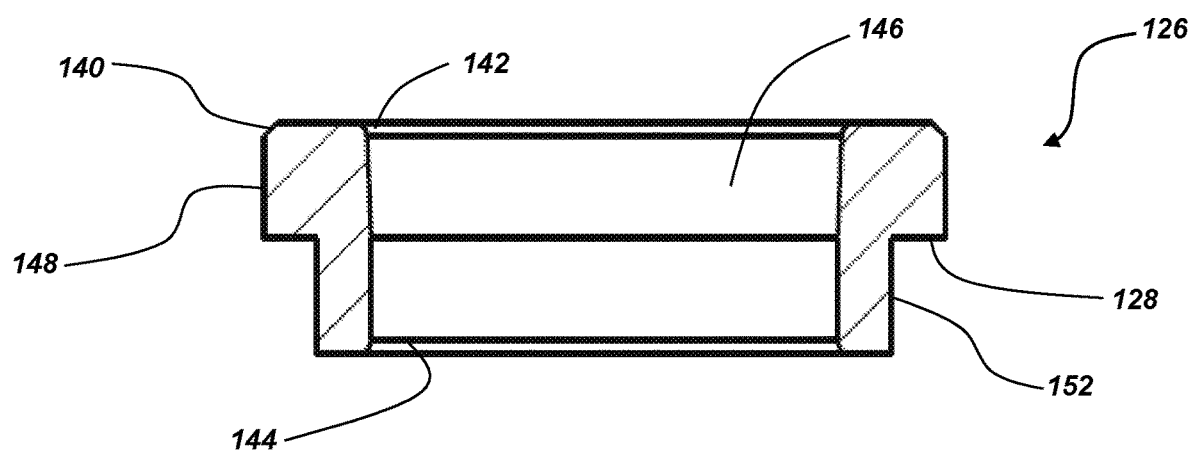
FIG. 6 is a cross-sectional view of the end ring shown in FIG. 5.

FIGS. 5 and 6 illustrate an embodiment of the inner ring 126. The inner ring 126 may comprise an annular shape (e.g., circular, ring shaped). The inner surface 146 of the inner ring 126 may define an annular passage 150 (e.g., bore, opening, void) through the center of the inner ring 126. The annular passage 150 may be complementary to the stem 104 (FIGS. 1 through 4). In some embodiments, the outer edge 140, the distal inner edge 142, and the proximal inner edge 144 of the inner ring 126 may comprise annular chamfered surfaces. In some embodiments, the inner ring 126 may include a shelf 128 and a locating surface 152. For example, the inner ring 126 may have a first diameter defined by the outer surface 148 and a second diameter defined by the locating surface 152. The second diameter may be smaller than the first diameter such that the shelf 128 is defined where the first diameter and the second diameter meet.

Figure 7:
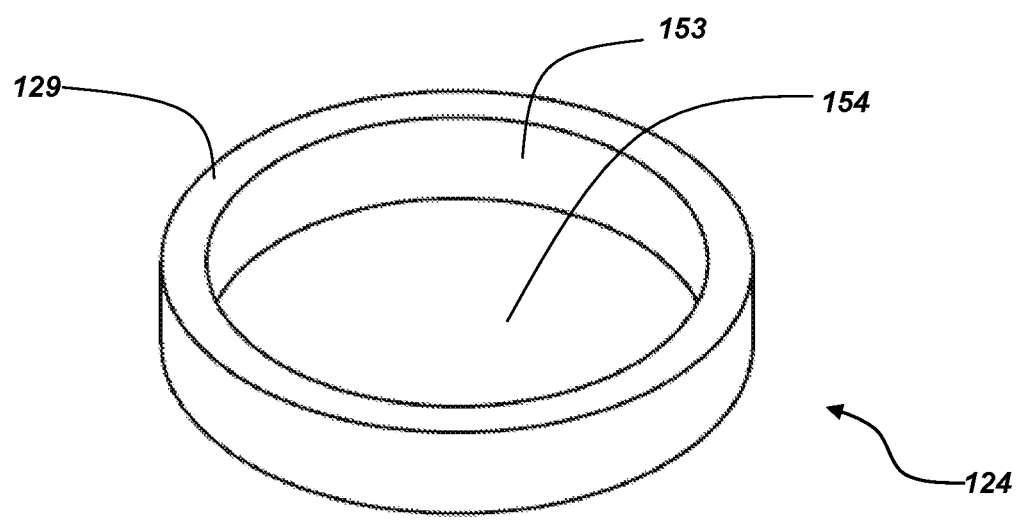
FIG. 7 is an isometric view of an outer ring according to an embodiment of the present disclosure.
Figure 8:
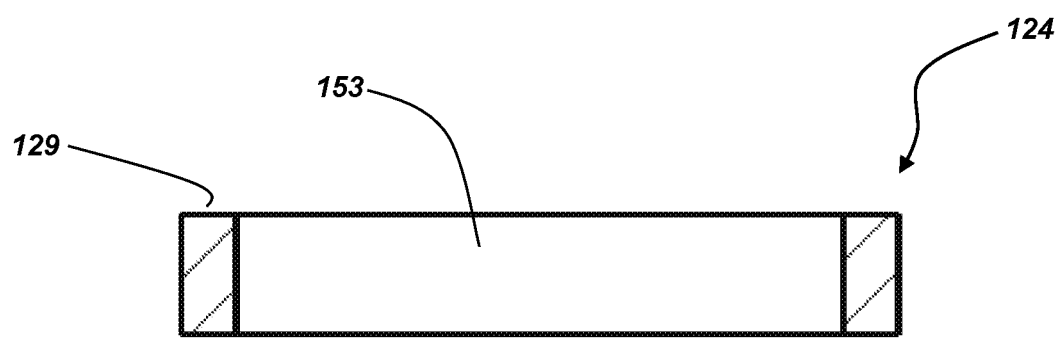
FIG. 8 is a cross-sectional view of the outer ring shown in FIG. 7.

FIGS. 7 and 8 illustrate an embodiment of the outer ring 124. In some embodiments, the outer ring 124 may be annular. The outer ring 124 may include a retaining surface 129 and an inner surface 153. The inner surface 153 of the outer ring 124 may define an inner void 154 (e.g., passage, bore, opening). In some embodiments, the inner void 154 may be configured to be complementary to the locating surface 152 (FIG. 5) of the inner ring 126 (FIG. 5). In some embodiments, the retaining surface 129 may be configured to rest against the shelf 128 (FIG. 5) of the inner ring 126 (FIG. 5).

Embodiments of the disclosure may include method of making and/or using such seals, packings, and valve assemblies. For example, a seal may be formed or defined in a valve assembly utilizing the packings discussed herein.

Valves according to embodiments of the present disclosure may provide significant improvements to valves used in high temperature and/or high pressure applications. Valves according to the present disclosure may include temperature resilient bonnet assemblies capable of being installed near the working fluid in high temperature applications. Packing stacks according to embodiments of the present disclosure may be capable of continuous service at temperatures in excess of 1,200° F. (648.9° C.). Improved temperature resilience may enable valves used in high temperature applications to be constructed with the bonnet assembly proximate to the working fluid without the need for a portion of the assembly to dissipate heat from the working fluid. This in turn may enable smaller valve assemblies in high temperature and/or high pressure applications. Reduced valve sizes may further result in space savings in crowded applications as well as material and cost savings.

Valves according to embodiments of the present disclosure may provide significant improvements for use in high pressure applications as well. End ring assemblies with tight clearances may improve the ability of the end rings to retain packing material within the bonnet assembly at elevated pressures. For example, tight clearances enabled by embodiments of the instant disclosure may substantially prevent packing material from extruding past the end ring at elevated pressures. If packing material extrudes past the end rings it may result in catastrophic failure of the valve. At elevated pressures catastrophic failures have the potential for causing severe injuries or death and at the very least equipment damage and equipment down time. Providing tight clearances may increase the system pressures where the valves may be safely operated.

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventor.

What is claimed is:

1. A method of defining a seal in a valve assembly, the method comprising:
   disposing sealing elements of a valve stem packing in a cavity defined around a valve stem and a valve body, the valve stem coupled to a valve element configured to alter fluid flow through the valve body;
   positioning a first end element of the valve stem packing comprising an inner element and an outer element in the cavity adjacent to a first axial end of the sealing elements, the positioning comprising:
      positioning the inner element proximate to the valve stem, the inner element extending continuously between the valve stem and the valve body; and
      positioning the outer element at the first axial end of the sealing elements and at a location radially spaced and separated from the valve stem;
   positioning a second end element of the valve stem packing comprising an inner element and an outer element in the cavity adjacent to a second axial end of the sealing elements opposing the first axial end, the positioning comprising:
      positioning the inner element proximate to the valve stem; and
      positioning the outer element at the second axial end of the sealing elements and at a location radially spaced and separated from the valve stem;
   abutting a first sealing element of the sealing elements with both the inner element and the outer element of the first end element in the cavity;
   abutting a second sealing element of the sealing elements with both the inner element and the outer element of the second end element in the cavity; and
   at least partially retaining the sealing elements within the cavity with at least one of the first end element or the second end element.

2. The method of claim 1, further comprising selecting an axial height of the inner element of at least one of the first end element or the second end element to be approximately double an axial height of the outer element of at least one of the first end element or the second end element.

3. The method of claim 1, further comprising selecting the sealing elements to comprise between two and five sealing elements side by side in the cavity.

4. The method of claim 1, further comprising selecting an axial height of the inner element of at least one of the first end element or the second end element to be between one and a half times and three times an axial height of the outer element of at least one of the first end element or the second end element.

5. The method of claim 1, further comprising positioning the outer element at least one of the first end element of the second end element in a notch defined in the inner element of the at least one of the first end element or the second end element.

6. The method of claim 1, further comprising moving the inner element and the outer element of at least one of the first end element or the second end element relative to the valve stem in order to retain the sealing elements.

7. The method of claim 1, further comprising selecting a radial width of the inner element of at least one of the first end element or the second end element to be between approximately double a radial width of the outer element of at least one of the first end element or the second end element.

8. The method of claim 1, further comprising selecting at least one of the first end element and the second end element to comprise a metal material.

9. The method of claim 8, further comprising selecting the metal material to comprise a material that is the same as a metal material of the valve body.

10. A valve assembly, comprising:
a valve body;
a valve stem extending from the valve body; and
at least one seal between the valve body and the valve stem, the at least one seal defined by the method of claim 1.

11. A method of defining a seal in a valve assembly, the method comprising:
disposing sealing elements of a valve stem packing in a valve body at a valve stem, the valve stem coupled to a valve element configured to alter fluid flow through the valve body;
positioning a first end element of the valve stem packing comprising a first inner element and a first outer element in the valve body on one side of the sealing elements such that the first outer element in is contact with the one side of the sealing elements;
positioning a second end element of the valve stem packing comprising a second inner element and a second outer element in the valve body on an opposing side of the sealing elements such that the second outer element in is contact with another side of the sealing elements, wherein the first end element and the second end element are positioned in a mirrored configuration relative to each other;
selecting at least one of the first end element or the second end element to be structurally distinct from the at least one sealing element; and
selecting a radial width of at least one of the first inner element or the second inner element to be between approximately double a radial width of at least one of the first outer element or the second outer element.

12. The method of claim 11, further comprising selecting both the first end element and the second end element to exhibit a cross section that is different than a cross section of the sealing elements.

13. The method of claim 11, further comprising selecting at least one of the first end element and the second end element to comprise a metal material.

14. The method of claim 13, further comprising selecting the metal material to comprise a material that is the same as a metal material of the valve body.

15. A valve assembly, comprising:
a valve body;
a valve stem extending from the valve body; and
at least one seal between the valve body and the valve stem, the at least one seal defined by the method of claim 11.

16. A valve assembly, comprising:
a valve body;
a valve stem extending from the valve body; and
at least one seal between the valve body and the valve stem, the at least one seal defined by the method of claim 12.

17. A method of defining a seal in a valve assembly, the method comprising:
disposing sealing elements of a valve stem packing in a valve body at a valve stem, the valve stem coupled to a valve element configured to alter fluid flow through the valve body;
positioning a first end element of the valve stem packing comprising a first inner element and a first outer element in the valve body on one side of the sealing elements such that the first outer element in is contact with the one side of the sealing elements, the positioning the first end element comprising:
positioning the first inner element proximate to the valve stem; and
positioning the first outer element at a location radially spaced and separated from the valve stem;
positioning a second end element of the valve stem packing comprising a second inner element and a second outer element in the valve body on an opposing side of the sealing elements such that the second outer element in is contact with another side of the sealing elements, wherein the first end element and the second end element are positioned in a mirrored configuration relative to each other, the positioning the second end element comprising:
positioning the second inner element proximate to the valve stem; and
positioning the second outer element at a location radially spaced and separated from the valve stem; and
selecting at least one of the first end element or the second end element to be structurally distinct from the at least one sealing element.

18. The method of claim 17, further comprising selecting at least one of the first end element and the second end element to comprise a metal material.

19. The method of claim 18, further comprising selecting the metal material to comprise a material that is the same as a metal material of the valve body.

20. A valve assembly, comprising:
a valve body;
a valve stem extending from the valve body; and
at least one seal between the valve body and the valve stem, the at least one seal defined by the method of claim 17.

* * * * *